(12) United States Patent
Yamazaki

(10) Patent No.: US 6,452,968 B2
(45) Date of Patent: *Sep. 17, 2002

(54) CIRCUITRY AND APPARATUS FOR CONVERTING A DECODED IMAGE WITH A MACROBLOCK/RASTER SCAN CONVERSION CAPABILITY

(75) Inventor: Masato Yamazaki, Tokyo (JP)

(73) Assignee: Oki Electric Industry Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/167,992

(22) Filed: Oct. 8, 1998

(30) Foreign Application Priority Data

Oct. 31, 1997 (JP) ............................................. 9-301089

(51) Int. Cl.⁷ ................................................. H04B 1/66
(52) U.S. Cl. ......................... 375/240; 382/232; 382/233
(58) Field of Search ................................ 348/416, 402, 348/413, 415, 443, 445; 382/232, 233

(56) References Cited

U.S. PATENT DOCUMENTS

| | | | |
|---|---|---|---|
| 5,579,052 A | | 11/1996 | Artieri |
| 5,600,837 A | | 2/1997 | Artieri |
| 5,617,142 A | * | 4/1997 | Hamilton .................... 348/405 |
| 5,668,599 A | * | 9/1997 | Cheney et al. ............... 348/402 |
| 5,742,347 A | * | 4/1998 | Kandlur et al. .............. 348/426 |
| 5,825,424 A | * | 10/1998 | Canfield et al. ............. 348/416 |
| 5,847,762 A | * | 12/1998 | Canfield et al. ............. 348/415 |
| 5,912,709 A | * | 6/1999 | Takahashi .................... 348/416 |
| 5,920,353 A | * | 7/1999 | Diaz et al. ................... 348/402 |

FOREIGN PATENT DOCUMENTS

JP 7-59084 3/1995

\* cited by examiner

*Primary Examiner*—Chris Kelley
*Assistant Examiner*—Shawn S. An
(74) *Attorney, Agent, or Firm*—Venable; Robert J. Frank; Michael A. Sartori (57) ABSTRACT

Decoded image converting circuitry includes a display image compression circuit to which image data are input in the form of consecutive macroblocks. The compression circuit compresses each macroblock, a sequence of sixteen horizontal image data at a time, with a preselected compression ratio. The compressed image data representative of an I (Intra coded) picture and a P (Predictive coded) picture are written to a first memory while the compressed image data representative of a B (Bidirectionally predictive coded) picture are written to a second memory. The image data stored in the first and second memories each is read out at a preselected timing allowing raster scan data to be formed. A display image expansion circuit expands the compressed I and P pictures and B picture and thereby outputs raster scan data. An apparatus including the decoded image converting circuitry and a method practicable with the apparatus are also disclosed.

4 Claims, 12 Drawing Sheets

PRIOR ART

| DECODING | I0 | P1 | B2 | B3 | P4 | B5 |
|---|---|---|---|---|---|---|
| DISPLAY | — | I0 | B2 | B3 | P1 | B5 |
| R P | FM1 | FM2 | FM3 | FM3 | FM1 | FM3 |
| F P | — | FM1 | FM1 | FM1 | FM2 | FM2 |
| B P | — | — | FM2 | FM2 | — | FM1 |
| D P | — | FM1 | FM3 | FM3 | FM2 | FM3 |

Fig. 6
PRIOR ART

| DECODING | I0 | P1 | B2 | B3 | P4 | B5 |
|---|---|---|---|---|---|---|
| DISPLAY | — | I0 | B2 | B3 | P1 | B5 |
| R P | FM1(w) | FM2(w) | FM3(w) | FM3(w) | FM1(w) | FM3(w) |
| F P | — | FM1(r) | FM1(r) | FM1(r) | FM2(r) | FM2(r) |
| B P | — | — | FM2(r) | FM2(r) | — | FM1(r) |
| D P | — | FM1(r) | FM3(r) | FM3(r) | FM2(r) | FM3(r) |
| FREQUENCY OF ACCESS TO FRAME MEMORY | 1 | 3 | 4 | 4 | 3 | 4 |

CIRCUITRY AND APPARATUS FOR CONVERTING A DECODED IMAGE WITH A MACROBLOCK/RASTER SCAN CONVERSION CAPABILITY

BACKGROUND OF THE INVENTION

1. Field of the Invention

The present invention relates to circuitry, an apparatus and a method for the conversion of a decoded image and also to a data recording medium capable of being read by a computer and storing a decoded image conversion program. The present invention is applicable to circuitry and an apparatus for decoding data coded by an MPEG (Moving Picture Coding Experts Group) 2 or similar standardized system and displaying an image represented by the decoded data.

2. Description of the Background Art

It is a common practice with an image coding system based on the MPEG2 system to divide one frame of picture into macroblocks each having 16×16 pixels. Redundant information included in the frame are compressed in the time domain macroblock by macroblock. In addition, to implement a random access function and a high coding efficiency, the MPEG2 type system defines three different picture types, i.e., an I (Intra coded) picture, a P (Predictive coded) picture, and a B (Bidirectionally predictive coded) picture on a frame basis.

An I picture is coded within a frame (intra coding) independently of the other pictures. All the macroblocks constituting an I picture are subjected to intra coding. By arranging such I pictures periodically, it is possible to effect random access or to use I pictures as error recovery pointers. While frequent appearance of I pictures lowers the total coding efficiency of the coding system, a higher coding efficiency is achievable with I pictures at scene switchover points and for images with a low prediction efficiency. A P picture is a forward predictive coded picture, i.e., subjected to predictive coding using an I picture or a P picture appeared in the past. A B picture is a bidirectionally predictive coded picture, i.e., subjected to predictive coding using I pictures or P pictures included in one or both of two pictures preceding and following the B picture; the direction of prediction is selected macroblock by macroblock. Even in a region where a certain object appears or disappears, B pictures allow predictive coding to be accurately effected by use of preceding and/or following pictures and noticeably enhance the coding efficiency.

Figure 2:
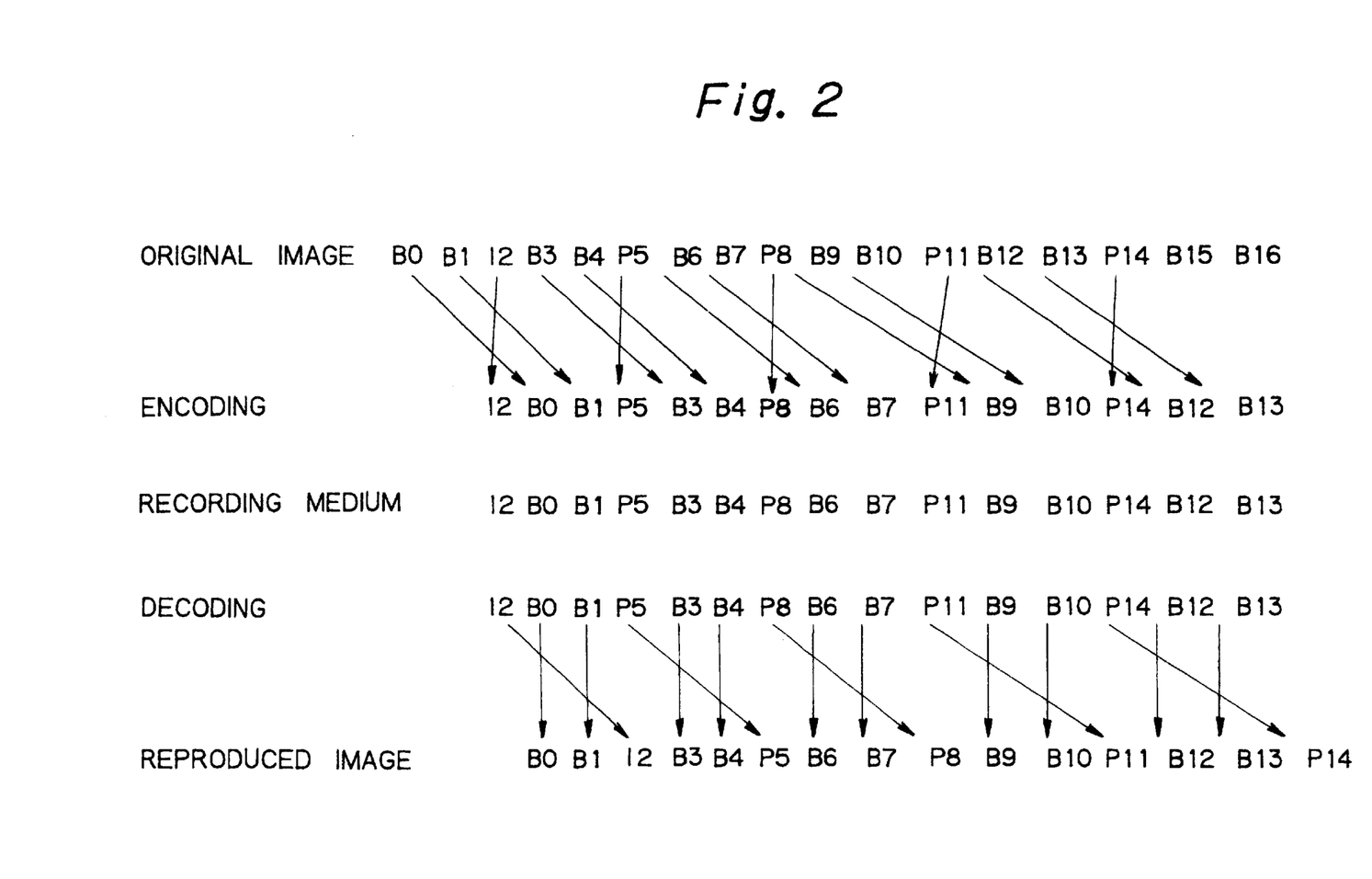
FIG. 2 demonstrates how I, B and P pictures are coded, decoded and reproduced by a conventional system.

I, P and B pictures may be combined in any desired format feasible for the object of a coding apparatus. As for the coding order, I pictures and P pictures following B pictures with respect to time are coded before the B pictures. FIG. 2 shows a specific original image represented by a sequence of pictures B0, B1, I2, B3, B4, P5, B6, B7, P8, B9, B10, P11, B12, B13 and B14. These pictures are coded in the order of I2, B0, B1, P5, B3, B4, P8, B6, B7, P11, B9, B10, P14, B12 and B13, as shown below the above original sequence in FIG. 2. The coded picture sequence is written to a recording medium and then decoded in the same order as it has been coded, as shown in the middle part of FIG. 2. Finally, the decoded sequence is rearranged in the original order, i.e., B0, B1, I2, B3, B4, P5, B6, B7, P8, B9, B10, P11, B12, B13 and B14 and then displayed as a reproduced image.

Figure 3:
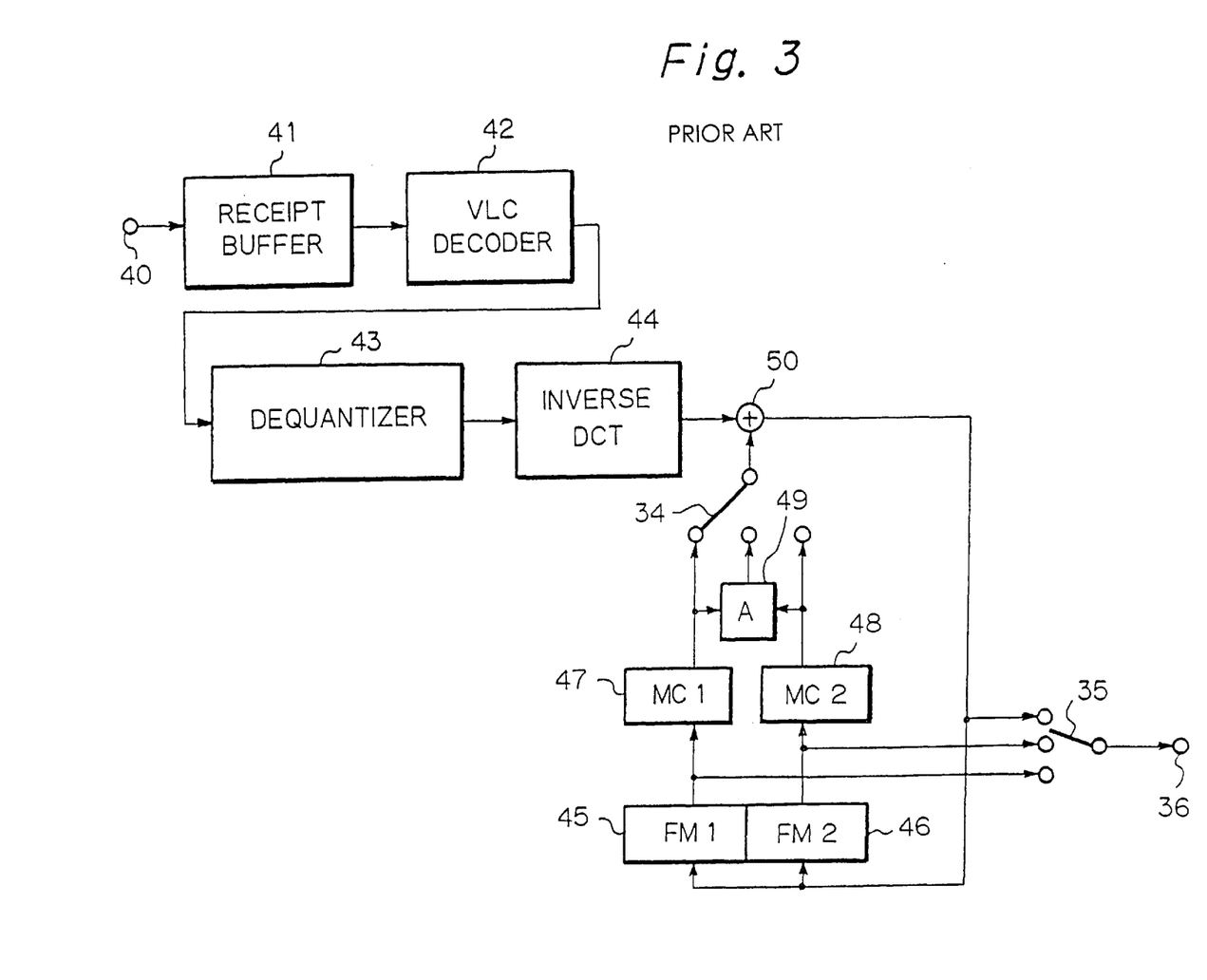
FIG. 3 is a block diagram schematically showing conventional MPEG2 type decoding circuitry.

FIG. 3 shows conventional decoding circuitry based on the MPEG2 system. As shown, a coded bit stream coming in through an input port 40 is written to a receipt buffer 41. A VLC (Variable Length Code) decoder 42 separates the coded data into various kinds of data. Among the separated data, quantized DCT (Discrete Cosine Transform) coefficients are dequantized by a dequantizer 43 to turn out DCT coefficients. The DCT coefficients are subjected to inverse DCT transform by an inverse DCT 44. If the image data are representative of an I picture, then they are directly written to one of two frame memories (FM1 and FM2) 45 and 46.

Assume that the image data output from the inverse DCT 44 are representative of a P picture. Then, image data subjected to motion compensation by a motion compensation circuit (MC1) 47 in accordance with motion vectors are read out of the frame memory 45. Of course, such data may be those subjected to motion compensation by the other motion compensation circuit (MC2) 48 and read out of the other frame memory 46. The image data read out of the frame memory 45 are selected by a switch 34 and added, pixel by pixel, to the image data output from the inverse DCT 44 by an adder 50. The image data output from the adder 50 are written to the other frame memory 46. When the image data output from the inverse DCT 44 are representative of a B picture, image data respectively subjected to motion compensation by the motion compensation circuits 47 and 48 in accordance with motion vectors are respectively read out of the frame memories 45 and 46. In this case, an averaging circuit (A) 49 averages the image data read out of the frame memories 45 and 46 and outputs the resulting mean values in the form of pixel values. The pixel values are selected by the switch 34 and added, pixel by pixel, to the image data output from the inverse DCT 44 by the adder 50. However, the reproduced image derived from the B picture is written neither to the fame memory 45 nor to the frame memory 46. The frame memories 45 and 46 are assumed to be used alternately.

The B picture reproduced by the above processing is directly output via an output port 36. The I and P pictures also reproduced by the above processing each is read out of the associated frame memory 45 or 46 and then output via the output port 36. As a result, a reproduced image is successfully displayed in the same order as the original image. A switch 35 selects one of the outputs of the adder 50, and frame memories 45 and 46 at a time.

In practice, however, the decoding circuitry based on the MPEG2 system is usually constructed to output display image data in the interlacing order. Therefore, the decoding circuit of the type outputting image data in the form of macroblocks must be followed by a memory for macroblock/raster scan conversion. Moreover, if the picture coding type has a frame structure, as distinguished from a field structure, then the above memory must be capable of storing at least half a field of image data when image data are output by interlacing.

Figure 4:
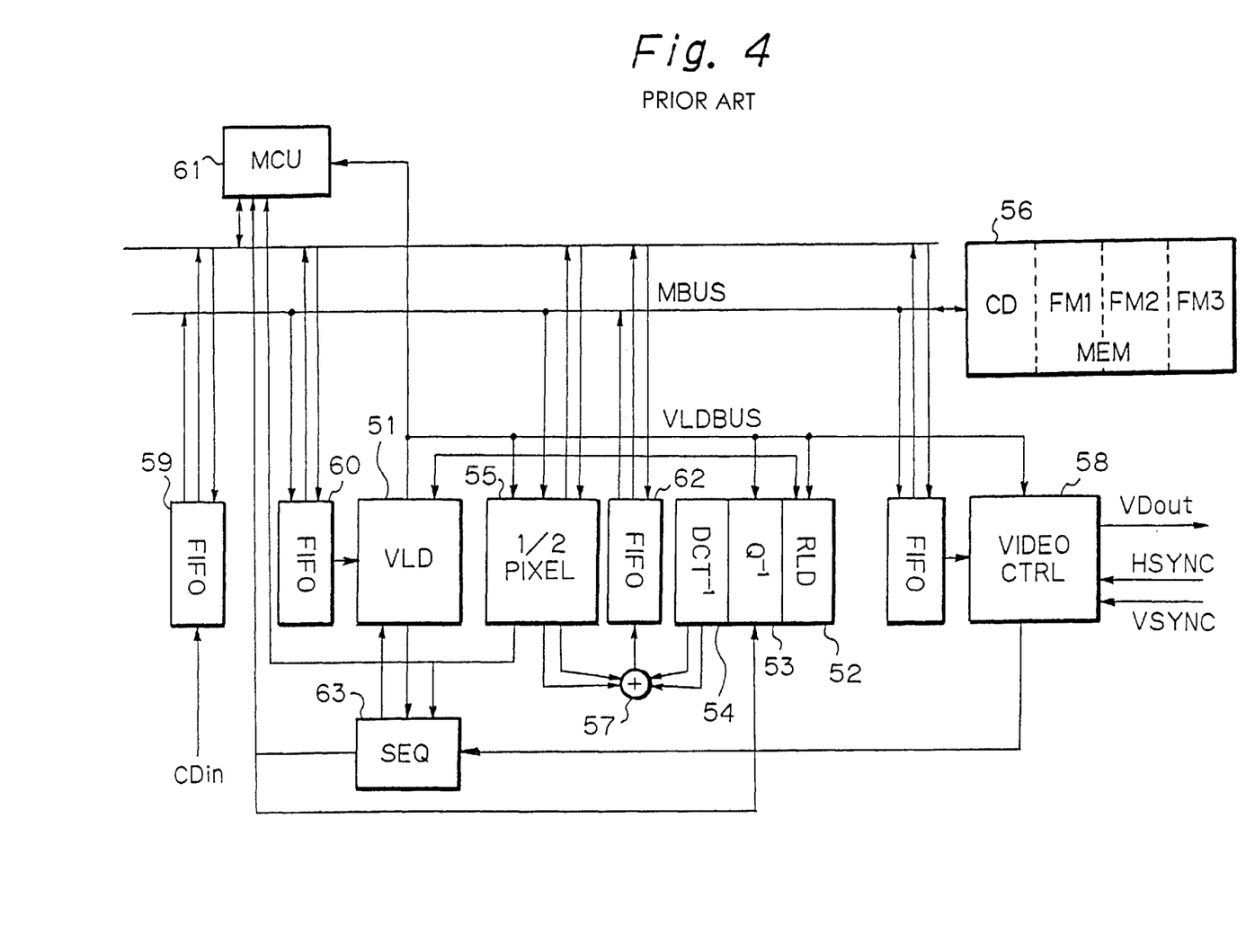
FIG. 4 is a block diagram schematically showing a conventional MPEG type decoded image display apparatus.

To solve the above problem, Japanese patent laid-open publication No. 59084/1995 discloses an image processing system capable of dealing with compressed image data fed thereto in the form of packets. Specifically, as shown in FIG. 4, the image processing system taught in the above document includes three frame memory areas FM1, FM2 and FM3 exclusively assigned to I pictures, P pictures and B pictures, respectively. With these frame memory areas FM1, FM2 and FM3, it is possible to output image data in the interlacing order even when the picture coding type has a frame structure. More specifically, the image processing system uses four picture pointers RP, FP, BP and DP (see FIGS. 5 and 6) in order to determine the frame memory area FM1, FM2 or FM3 which a memory controller MCU should access. The picture pointers RP, FP, BP and DP respectively point at the frame memory areas where a current reproduced picture, a forward picture, a backward picture, and a current display picture are stored.

Figure 5:
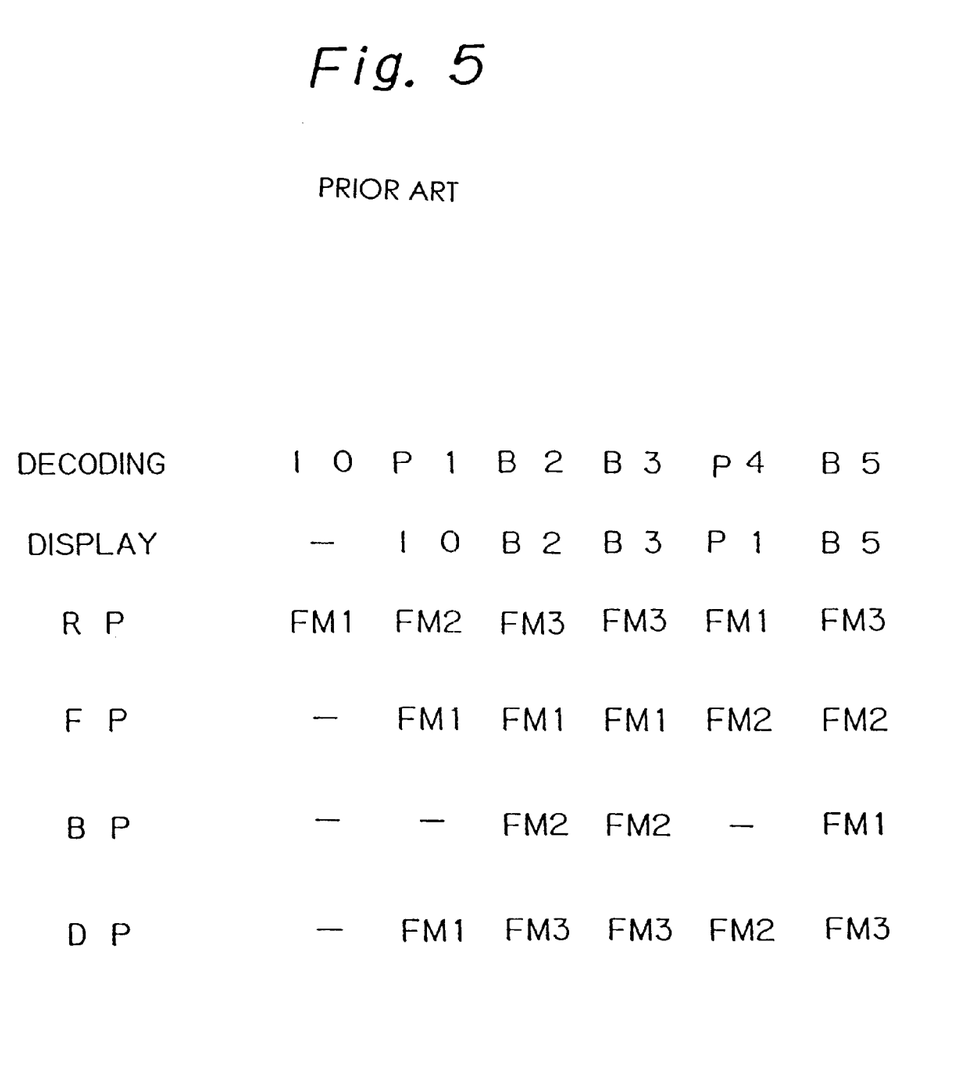
FIG. 5 shows the transition of fame memory pointers particular to the decoding circuitry of FIG. 4.

FIG. 5 demonstrates the transition of the picture pointers RP, FP, BP and DP occurring when pictures of different types are decoded and displayed. At the time when the first picture I0 is decoded, the image is not displayed yet. At this instant, the reproduced picture pointer RP points at an unoccupied area for storing the picture I0, e.g., the frame memory area FM1.

When a picture P1 following the picture I0 is decoded, the picture I0 is displayed without fail. At this instant, the reproduced picture pointer RP points at, e.g., the frame memory area FM2 while the display picture pointer DP points at the frame memory area FM1 storing the picture I0. Because a predictive picture for P1 need the forward picture I0 at the time of reproduction, the forward picture pointer FP also points at the fame memory area FM1.

When a picture B2 is decoded, it is also displayed. Both the reproduced picture pointer RP and display picture pointer DP point at the unoccupied frame memory area FM3. For the picture B2, the forward image I0 and backward image P1 are necessary at the time of decoding. At this instant, the forward picture pointer FP and backward picture pointer BP point at the frame memory areas FM1 and FM2, respectively.

It is a common practice with a display to delay an image by substantially half an image, so that the image can be displayed when decoded. Even when image data are read out every other line, i.e., by interlacing at the time of display despite that the picture coding type has a frame structure, the above delay of the image allows the decoding of image data located at a position to be read out for display to complete before display without fail.

A picture B3 is also displayed when decoded. Because the picture B3 needs the pictures I0 and P1 at the time of decoding, the forward picture pointer FP and backward picture pointer BP point at the frame memory areas FM1 and FM2, respectively. The reproduced picture pointer RP points at the frame memory area FM3, so that the picture B3 is written to the area FM3. The display picture pointer DP points at the frame memory area FM3 as it did for the picture B2.

The picture B2 stored in the frame memory area FM3 is displayed at the same time as the decoded picture B3 is written to the area FM3. In the case where the reproduced picture B3 is about to be written over the picture B2 to be displayed, a variable length decoder (VLD) 51 (see FIG. 4) delivering the data of the picture B3 to the frame memory area FM3 is deactivated by a sequencer (SEQ) 63 (see FIG. 4). The sequencer 63 controls the variable length decoder 51 with an enable signal such that the decoded macroblock position of the picture B3 does not exceed the display position of the display picture B2.

When a picture P4 is decoded, the picture P1 is displayed without fail. The picture P4 is written to the frame memory area FM1 which become idle later. At this instant, the display picture pointer DP points at the frame memory area FM2 to store the picture P1. The picture P4 needs the forward picture P1 at the time of decoding. The forward picture pointer FP points at the frame memory area FM2.

When a picture B5 is decoded, it is also displayed without fail. The picture B5 is written to the frame memory area FM3 which becomes idle. At this instant, the reproduced picture pointer RP and display picture pointer DP both point at the frame memory area FM3. The picture B5 needs the forward picture P1 and the backward picture P4 having already been decoded. The forward picture pointer FP and backward picture pointer BP point at the frame memory areas FM2 and FM1, respectively.

Figure 6:
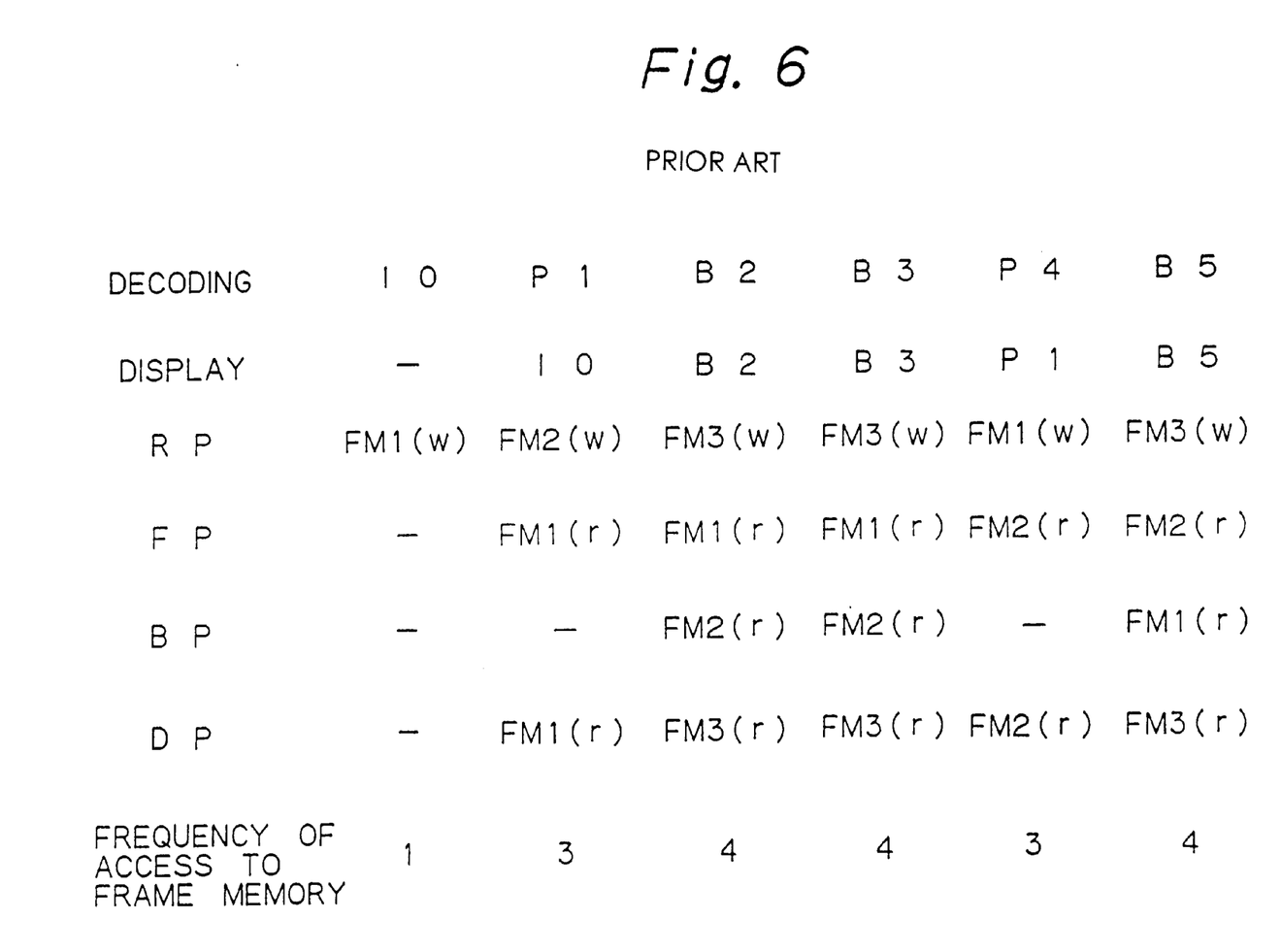
FIG. 6 shows the numbers of times of access to a frame memory included in the decoding circuitry of FIG. 4.

However, the conventional image processing system described above has the following problem left unsolved. As shown in FIG. 6, to decode a B picture, the system must read out two frames of images (forward predictive image and backward predictive image) at maximum as reference images within a single frame period, then store one frame of decoded image, and then read out one frame of image to be displayed. The system therefore needs a frame memory bus capable of transferring four frames of images within a single frame period for the decoding of an image and the conversion (display) of a decoded image. A frame memory bus with such a capacity corresponds to a frame memory bus MBUS shown in FIG. 4. Consequently, it is necessary to increase the bus width (bit width) of the frame memory for implementing rapid access to the frame memory or to use a frame memory capable of being rapidly accessed, resulting in an increase in the cost of the system.

SUMMARY OF THE INVENTION

It is therefore an object of the present invention to provide circuitry, an apparatus and a method for the conversion of a decoded image and capable of converting decoded image data to a sequence of image data for display (raster scan data) with a simple construction by reducing access to a frame memory and without resorting to a greater bus width.

It is another object of the present invention to provide a data recording medium capable of being read by a computer and storing a decoded image conversion program.

In accordance with the present invention, decoded image converting circuitry converts, on receiving decoded image data produced by dividing a frame image representative of a picture rearranged in accordance with the picture type into a plurality of small areas of image data, coding the small areas of image data, and decoding the resulting coded image data, the decoded image data to raster scan data area by area. The circuitry includes a compressing circuit for dividing the decoded image data of each small area into pixel data sequences each extending in the horizontal direction in a frame image, and compressing each pixel data sequence to thereby output compressed image data. A first storage stores, among the compressed image data output from the compressing circuit, compressed image data representative of an I picture and compressed image data representative of a P picture. A second storage stores, among the compressed image data output from the compressing circuit, compressed image data representative of a B picture. An expanding circuit takes in the compressed image data stored in the first and second storages in the order of the original picture and then expands them to thereby output the raster scan data.

Also, in accordance with the present invention, a decoded image converting apparatus includes an inverse transforming circuit for executing, on receiving coded image data coded by rearranging a picture in accordance with the picture type and subjecting the resulting picture to quantization and orthogonal transform, dequantization and inverse orthogonal transform with the coded image data to thereby output image data. A memory includes two memory areas for storing decoded image data respectively representative of an I picture and a P picture. An adder outputs, on receiving image data representative of an I picture from the inverse transforming circuit, the image data as decoded image data and writes them in one of the two memory areas of the memory. On receiving image data representative of a P picture from the inverse transforming circuit, the adder reads image data representative of an I picture or a P picture preceding the above P picture out of one of the two memory areas, adds the image data read out to the image data output from the inverse transforming circuit, and outputs the resulting decoded image data while writing them in the other memory area of the memory. Further, on receiving image data representative of a B picture from the inverse transforming circuit, the adder reads image data out of the two memory areas, produces mean values, and adds the mean values to the image data output from the inverse transforming circuit to thereby output decoded image data. A compressing circuit divides the decoded image data output from the adder into pixel data sequences each extending in the horizontal direction in a frame image, and compresses each pixel data sequence to thereby output compressed image data. A first storage stores, among the compressed image data output from the compressing circuit, compressed image data representative of an I picture and compressed image data representative of a P picture. A second storage stores, among the compressed image data output from the compressing circuit, compressed image data representative of a B picture. An expanding circuit takes in the compressed image data stored in the first and second storages in the order of the original picture and then expands them to thereby output raster scan data.

Further, in accordance with the present invention, a decoded image converting method converts decoded image data produced by dividing a frame image representative of a picture rearranged in accordance with the picture type into a plurality of small areas of image data, coding the small areas of image data, and decoding the resulting coded image data to raster scan data area by area. The method begins with the step of dividing the decoded image data of each small area into pixel data sequences each extending in the horizontal direction in a frame image, and compressing each pixel data sequence to thereby output compressed image data. Among the compressed image data output in the above step, compressed image data representative of an I picture and compressed image data representative of a P picture are written to a first storage while compressed image data representative of a B picture are written to a second storage. The compressed image data stored in the first and second storages are read out in the order of the original picture and then expanded to thereby output the raster scan data.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 7:
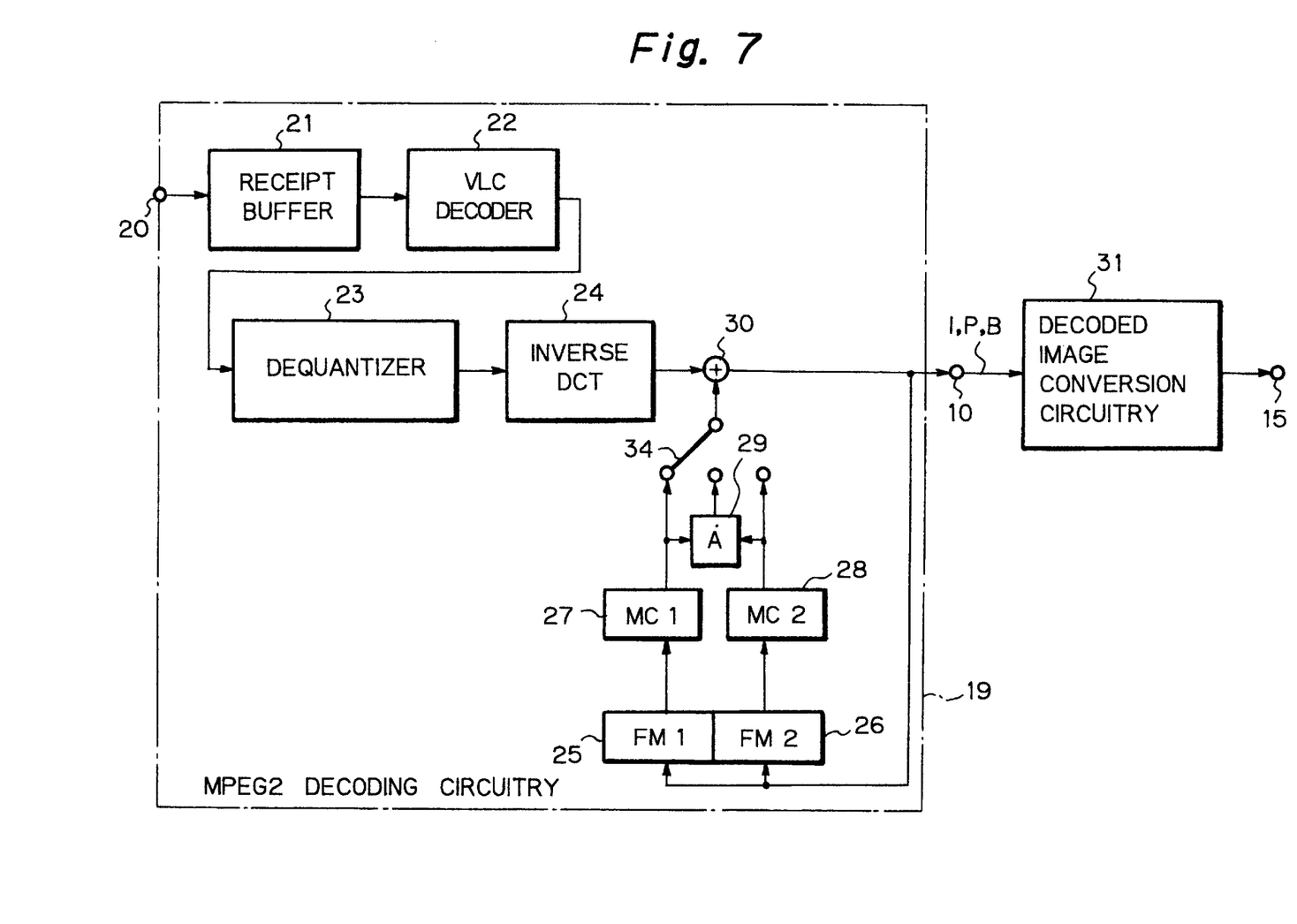
FIG. 7 is a block diagram schematically showing a decoded image converting apparatus also embodying the present invention and including the circuitry of FIG. 1.

Referring to FIG. 7, a coded image converting apparatus embodying the present invention is shown and generally made up of MPEG2 type decoding circuitry 19 and decoded image converting circuitry 31. As shown, the decoding circuitry 19 includes a receipt buffer 21, a VLC decoder 22, a dequantizer 23, and an inverse DCT 24. The receipt buffer 21 receives a bit stream representative of coded image data via an input port 20, stores the image data for a moment, and then delivers them to the VLC decoder 22 at a preselected timing. The VLC decoder 22 executes variable length coding with the input coded image data and thereby outputs compressed image data. More specifically, the VLC decoder 22 separates various parameters and compressed image data contained in the coded image data in accordance with the MPEG decoding procedure. The compressed image data are fed from the VLC decoder 22 to the dequantizer 23.

The dequantizer 23 dequantizes the input compressed image data in order to produce DCT coefficients and delivers the coefficients to the inverse DCT 24. The inverse DCT 24 executes inverse DCT with the DCT coefficients and feeds the resulting I picture, P picture or B picture to an adder 30 also included in the decoding circuitry 19.

The adder 30 outputs, among the I, P and B pictures input thereto, only the I picture as it is and delivers it to, e.g., a frame memory (FM1) 25 and an input port 10 included in the decoded image converting circuitry 31. On receiving a P picture, the adder 30 adds it, pixel by pixel, to image data received from, e.g., a frame memory (FM2) 26 and subjected to motion compensation by a motion compensation circuit (MC2) 28. The resulting sum data are also fed from the adder 30 to the frame memory 25 and input port 10. Further, when a B picture is applied to the adder, an averaging circuit (A) 29 averages image data read out of the frame memories 25 and 26 and respectively subjected to motion compensation by a motion compensation circuit (MC1) and the motion compensation circuit 28, thereby producing predictive pixel values. The adder 30 adds the predictive pixel values to the image data representative of the B picture pixel by pixel and delivers the resulting sum data to the input port 10. In this manner, the reproduced I, P and B pictures are fed to the decoded image converting circuitry 31 via the input port 10. In FIG. 7, the reference numeral 34 designates a switch.

The decoded image converting circuitry 31 compresses, on a macroblock basis, each of the I, P and B pictures input via the input port 10. The circuitry 31 adjusts the timing of the compressed image data, expands the image data, and then delivers the expanded image data or raster scan data via an output port 15.

Figure 1:
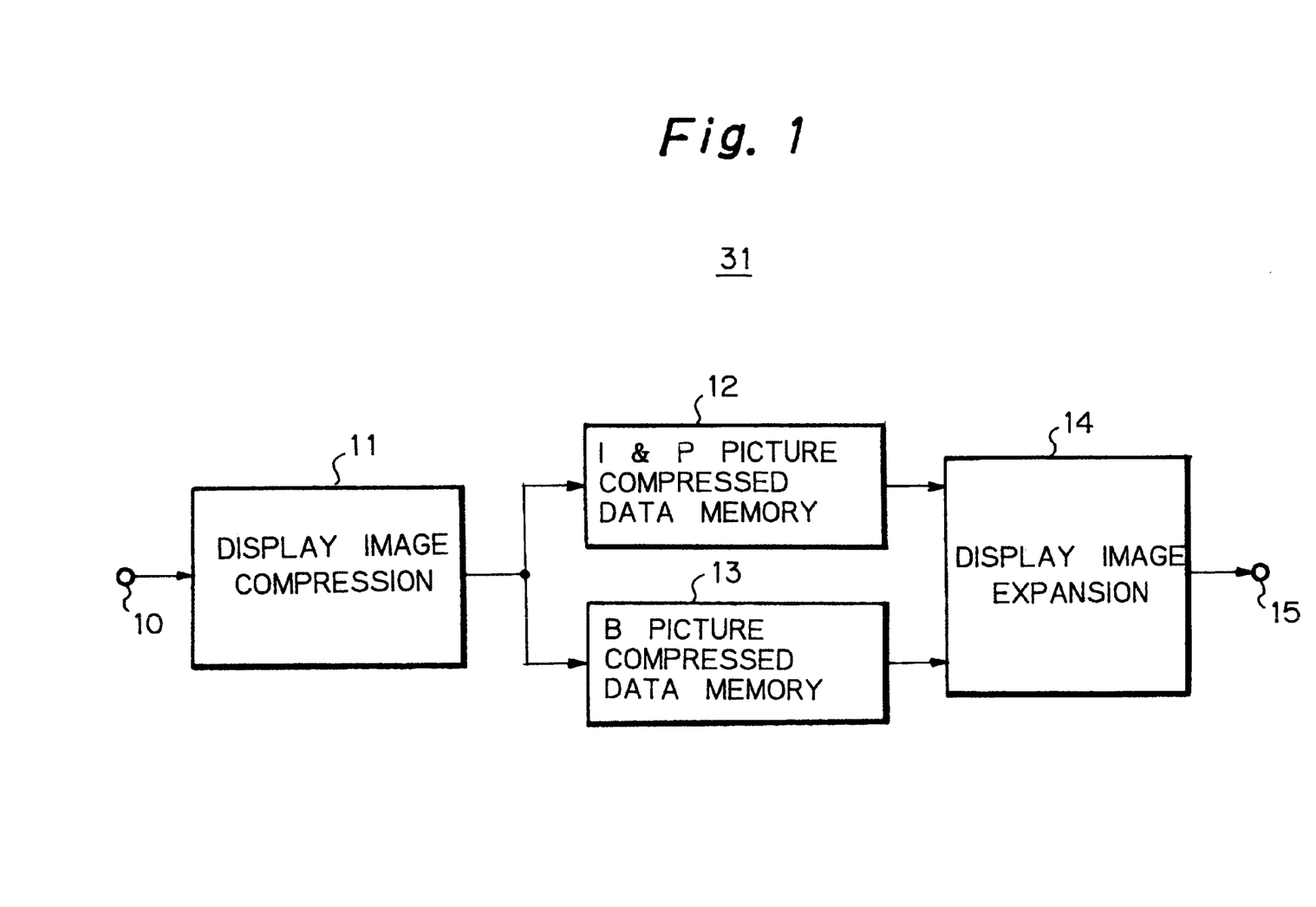
FIG. 1 is a block diagram schematically showing decoded image converting circuitry embodying the present invention.

More specifically, when the image data output from the inverse DCT 24 are representative of an I picture, they are written to one of the two frame memories 25 and 26, e.g., the frame memory 25 and delivered to the decoded image converting circuitry 31 via the input port 10 (see FIG. 1 also). When the image data output from the inverse DCT 24 are representative of a P picture, image data are read out of, e.g., the frame memory 26, subjected to motion compensation by the motion compensation circuit 28, and then added to the image data output from the inverse DCT 24 pixel by pixel. The results of addition are written to the other frame memory 25 and sent to the converting circuitry 31 via the input port 10. In the case of a B picture, image data are read out of both of the frame memories 25 and 26, respectively subjected to motion compensation by the motion compensation circuits 27 and 28, and then applied to the averaging circuit 29. The averaging circuit 29 averages the input image data in order to calculate predictive pixel values. Again, the adder 30 adds the image data output from the averaging circuit 29 to the image data output from the inverse DCT 24 pixel by pixel. The decoded image data representative of the B picture are written neither to the frame memory 25 nor to the frame memory 26, but are simply delivered to the converting circuitry 31 via the input port 10.

As stated above, the decoded image converting circuitry 31 receives decoded macroblock-by-macroblock image data via the input port 10. The circuitry 31 converts the input image data to an interlacing picture as typified by conventional television, as will be described hereinafter.

Figure 8:
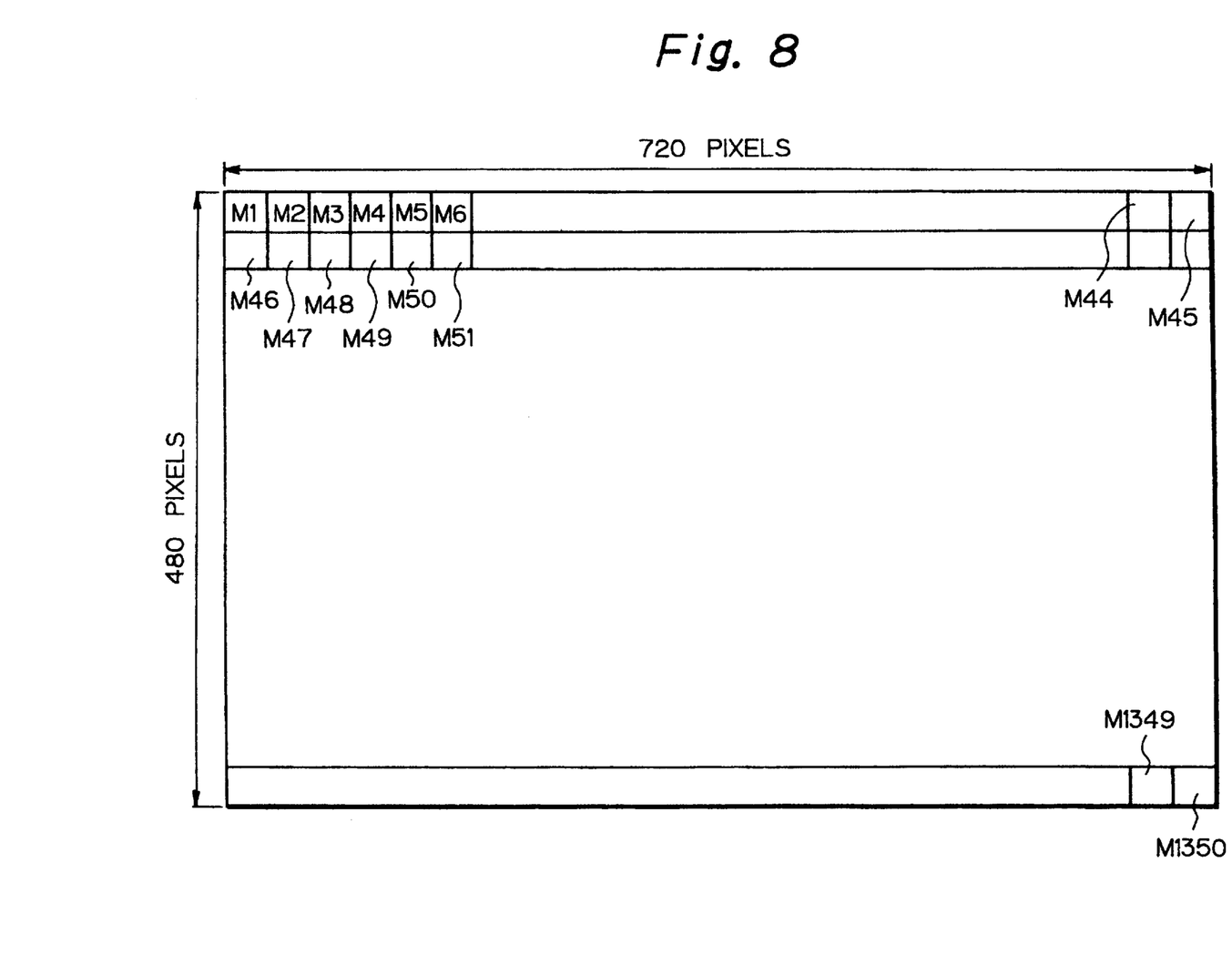
FIG. 8 shows a specific arrangement of macroblocks constituting a frame image in the apparatus of FIG. 7.

FIG. 8 shows a specific arrangement of macroblocks constituting a frame image in the illustrative embodiment. As shown, assume that a frame image has 720 pixels in the horizontal direction and 480 pixels in the vertical direction. Then, 1,350 macroblocks each being implemented as a 16×16 pixel matrix are present in the frame image. At the time of coding, the macroblocks are sequentially transferred in the raster scanning order. First, a row of macroblocks M1 to M45 respectively positioned at the top left and top right of the image are sequentially transferred, the macroblock M1 being first. Then, the next row beginning with a macroblock M46 is sequentially transferred from the left to the right. Such a procedure ends after the transfer of a macroblock M,1350 positioned at the bottom right of the frame image.

The image decoding operation of the decoding circuitry 19 and the operation of the decoded image conversion circuitry 31 may be executed by a computer on the basis of a decoded image conversion program. The decoded image conversion program may be stored in a main storage, auxiliary storage or similar recording medium which a computer can read. In practice, the above program may be stored in a ROM (Read Only Memory), a flash memory, a nonvolatile RAM (Random Access Memory), a magnetic disk device, an optical disk device, an IC (Integrated Circuit) memory card or a magnetic tape device.

Reference will be made to FIG. 1 for describing a specific configuration of the decoded image conversion circuitry 31. As shown, the decoded image data representative of any one of the I, P and B pictures are input to a display image compression 11 via the input port 10 macroblock by macroblock. The compression 11 compresses the image data by using the Huffman coding scheme. The compressed image data representative of the I picture and those representative of the P picture are fed from the compression 11 to an I and P picture compressed data memory 12. On the other hand, the compressed data representative of the B picture are fed from the compression 11 to a B picture compressed data memory 13.

The compressed I picture data and compressed P picture data each is read out of the I and P picture compressed data memory 12 at a preselected timing and fed to a display image expansion 14 to be transformed to raster scan data. Likewise, the compressed B picture data are read out of the B picture compressed data memory 13 at a preselected timing and fed to the expansion 14 to be transformed to raster scan data. The expansion 14 expands the compressed I, P and B picture data with the same principle as the compression 11, thereby outputting image data identical with the image data not subjected to compression. Such image data are fed out from the expansion 14 via an output port 15 as raster scan data.

The macroblocks shown in FIG. 8 are sequentially input to the compression 11 via the input port 10. The compression 11 compresses the image data with a preselected compression ratio on a macroblock basis. The compression 11 writes the image data representative of I pictures and the image data representative of P pictures in the I and P picture compressed data memory 12. The image data written to the memory 12 are read out at a preselected timing allowing raster scan data to be formed. Likewise, the compressed image data representative of B pictures and written to the B picture compressed image data memory 13 are read out at a timing allowing raster scan data to be formed. The expansion 14 expands the I, P and B pictures so as to output raster scan data.

If desired, an arbitration circuit may be connected between the compression 11 and the memories 12 and 13, so that the I and P pictures and the B pictures can be surely written to the memories 12 and 13, respectively. Also, the storage areas of the two memories 12 and 13 may be allotted to the address spaces of a pair of large capacity DRAMs (Dynamic RAMs) together with the storage areas of the frame memories 25 and 26, FIG. 7, assigned to the reference frame pictures. This can also be done if an arbitration circuit is used to prevent the reading of a reference picture and the writing of compressed image data from occurring at the same time. With the simple construction and procedure shown in FIG. 1, it is possible to transform the macroblock image data to raster scan data rapidly without resorting to a greater memory capacity.

Figure 9:
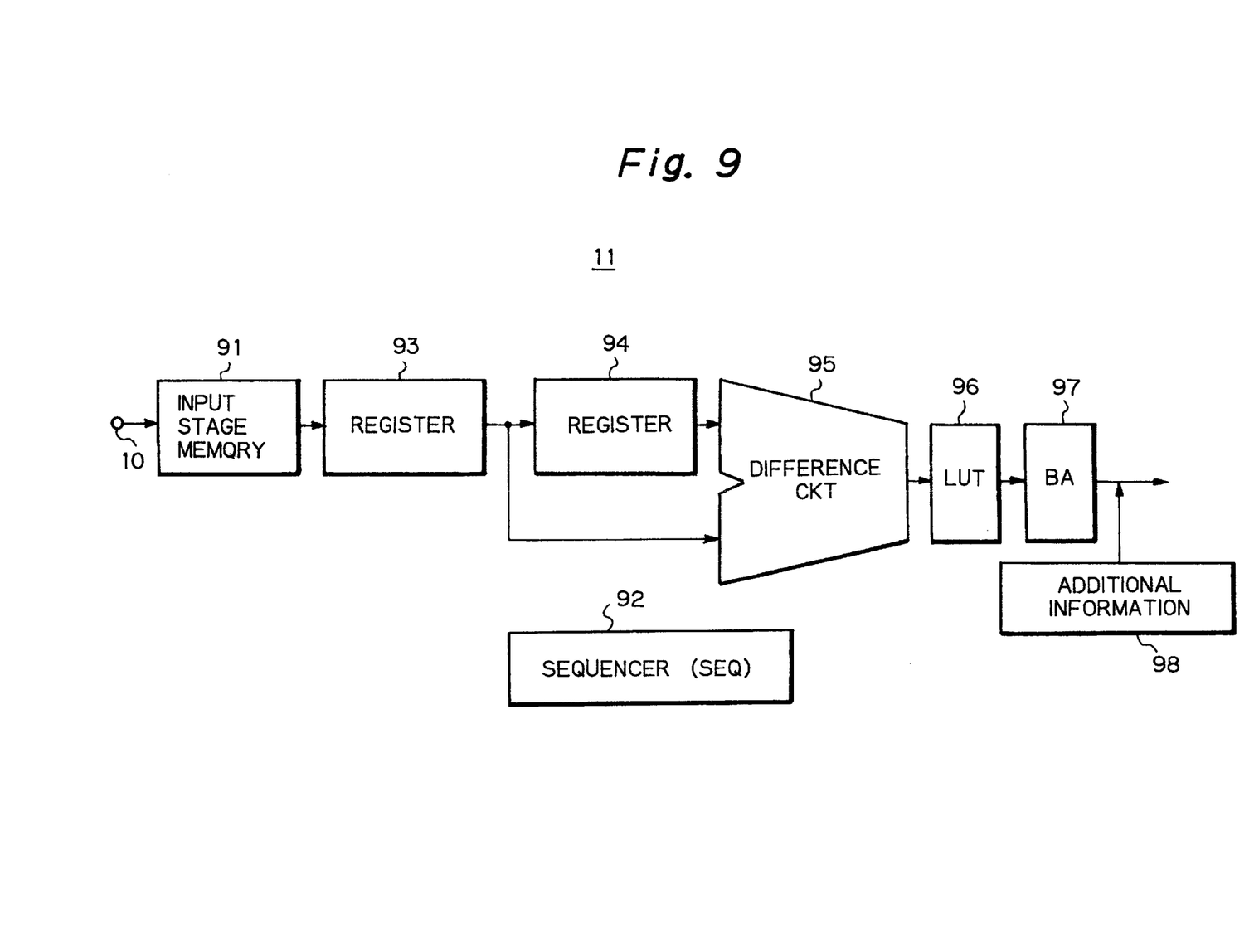
FIG. 9 is a schematic block diagram showing a specific configuration of a display image compression circuit included in the circuitry of FIG. 1.

A specific configuration of the display image compression 11 using the Huffman coding scheme will be described with reference to FIG. 9. As shown, the compression 11 includes an input stage memory 91 for temporarily storing the macroblock pixel data decoded on a macroblock basis. The input stage memory 91 should preferably have a capacity sufficient for storing one or more macroblocks of image data. The macroblock pixel data are read out of the memory 91 under the control of a sequencer (SEQ) 92 and fed to a first register 93. The sequencer 92 controls various circuits constituting the compression 11, i.e., controls a procedure beginning with the horizontal reading of the macroblock pixel data out of the memory 91 in the form of a frame image and ending with the output of compressed data from a byte aligning circuit (BA) 97 which will be described later.

The register 93 stores the input macroblock pixel data for a moment and delivers them to a second register 94 and a difference circuit 95. The second register 94 stores the macroblock pixel data for a moment and feeds them to the difference circuit 95. Specifically, the registers 93 and 94 each temporarily stores pixel data adjoining each other in the horizontal direction in a frame image.

The difference circuit 95 produces a difference between the macroblock pixel data output from the registers 93 and 94 and then feeds the difference to a look-up table (LUT) 96. The LUT 96 has a Huffman code table and outputs variable length coded data by using the above difference received from the difference circuit 95 as an address. The coded data are fed from the LUT 96 to the byte aligning circuit 97. The byte aligning circuit 97 arranges the coded data by, e.g., eight bits and outputs the resulting compressed data or byte data. Additional information 98 necessary for expansion are added to the byte data output from the circuit 97.

More specifically, the macroblock input to the compression 11 after image decoding is stored in the input stage memory 91 for a moment. When one macroblock is fully stored in the memory, the sequencer 92 feeds a macroblock read command to the memory 91. In response, the top left pixel data and fifteen successive pixel data of the macroblock are read out of the memory 91 in the horizontal direction. When the top left pixel data is coded, the difference circuit 95 does not operate, so that the value of that pixel itself is subjected to variable length coding by the LUT 96. The difference circuit 95 produces a difference between the top left pixel data and the next pixel data by using the top left pixel data as a predictive value. The difference is also subjected to variable length coding by the LUT 96.

As soon as the top right or sixteenth pixel data is coded by the LUT 96, the byte aligning circuit 97 performs a stuffing operation up to the end of the byte and then outputs compressed data. This is the end of transfer of the compressed data on the top line of the macroblock. The above procedure is repeated with the other fifteen lines following the top line. Consequently, all the sixteen lines constituting one macroblock are fully compressed.

While the compression 11 uses the Huffman coding scheme for compressing an image, it may use any other suitable data compression scheme, e.g., an arithmetic coding scheme.

Referring again to FIG. 1, the data compressed by the compression 11 in the horizontal direction are selectively applied to the I and P picture compressed data memory 12 or the B picture compressed data memory 13. The memory 13 assigned to B pictures is used not only to convert the macroblock to the raster scan data, but also to rearrange the image data input with a frame structure for the interlacing picture. The memory 12 assigned to I and P pictures is used not only to perform the above conversion of the macroblock and rearrangement of the image data, but also to match the order of the coded data to the display order in the manner described with reference to FIG. 2. In this sense, the memory 12 plays the role of a delay buffer at the same time.

The display image expansion 14 determines, based on a picture type being decoded, a picture type to be displayed this time, i.e., an I picture, a P picture or a B picture. The expansion 14 reads the compressed image data of the determined picture type out of the memory 12 or 13 in synchronism with the display timing. The expansion 14 reads them in the interlacing order. Then, the expansion 14 expands the image data by processing opposite to the processing of the expansion 11. The resulting raster scan data restored to the original order are output via the output port 15.

The data sequence to be compressed by the compression 11 in the horizontal direction has been shown and described as having sixteen pixels like one macroblock. Of course, such a data sequence is only illustrative and may have any other suitable number of pixels.

Figure 10:
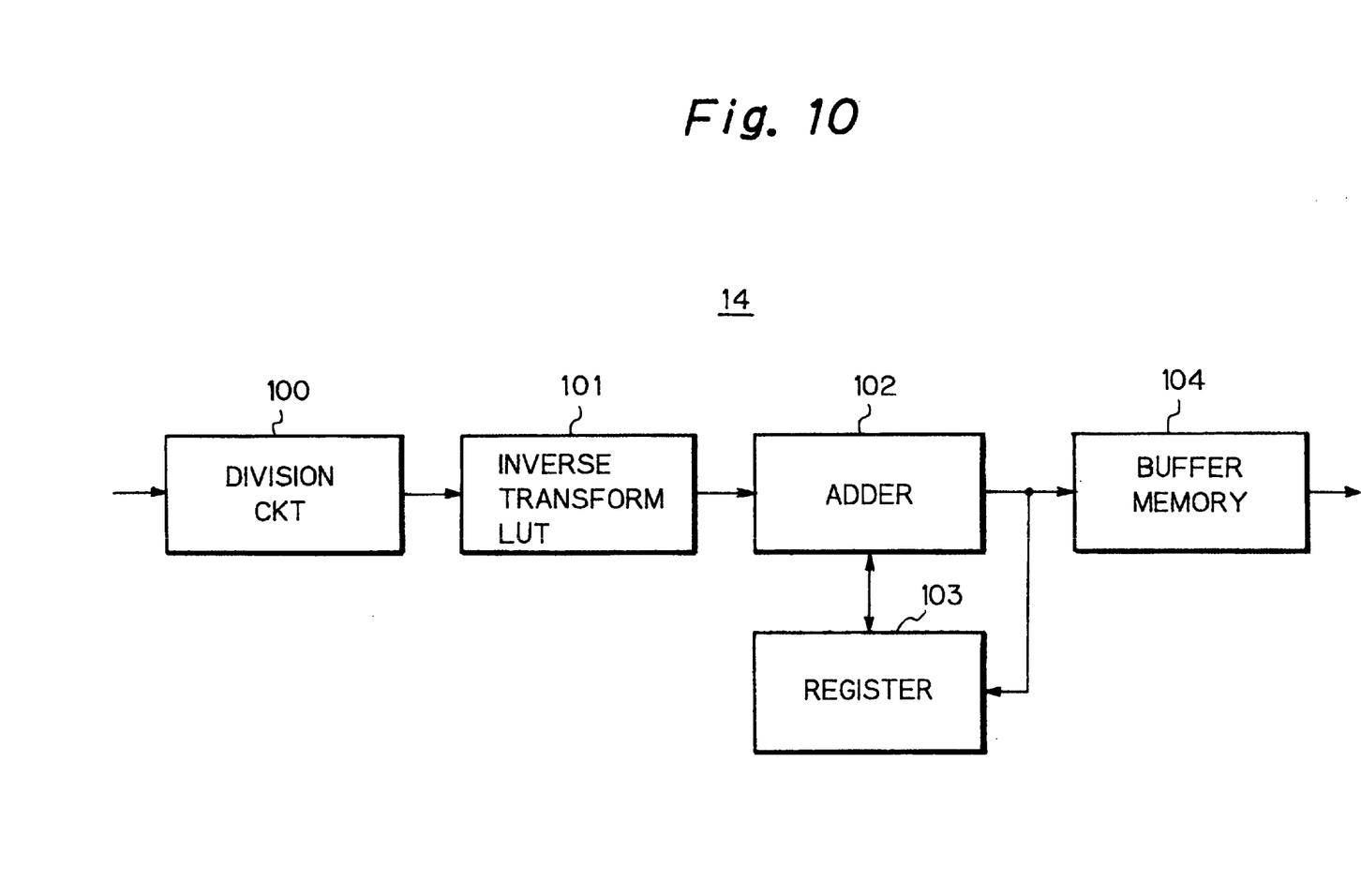
FIG. 10 is a schematic block diagram showing a specific configuration of a display image expansion circuit also included in the circuitry of FIG. 1.

FIG. 10 shows a specific configuration of the expansion 14. As shown, the compressed data and additional data are input to a division circuit 100. The division circuit 100 divides the compressed data into variable length coded data each having eight bits and feeds them to an inverse transform LUT 101. The inverse transform LUT 101 transforms the input coded data to a corresponding difference and delivers the difference to an adder 102. The adder 102 adds the difference and image data temporarily stored in a register 103 and feeds the resulting sum to the register 103 and a buffer memory 104 as macroblock pixel data. The buffer memory 104 stores the macroblock pixel data for a moment and reads it out at a suitable timing so as to output raster scan data.

The compression and expansion executed by the display image compression 11 and display image expansion 14, respectively, may be implemented as a coded image conversion program which can be read by a computer.

The construction and procedure of the decoded image conversion circuitry 31 shown in FIG. 1 is capable of executing macroblock/raster scanning (interlacing or noninterlacing) or similar conversion. The illustrative embodiment is therefore capable of decoding an image with two frame memories while the conventional circuitry needs three frame memories. This, coupled with the fact that the two frame memories can be exclusively used for image decoding, reduces the number of frames which should be transferred within a display time corresponding to a single frame from conventional four frames to two frames. Consequently, it is possible to reduce the conventional bit width of a memory bus for memory access and to use low-speed access video memories, realizing efficient processing.

Further, assume that the compressed image data memories 12 and 13 respectively assigned to I and P pictures and B pictures are implemented by a part of the memory space of a large capacity, I and P picture DRAM used to store reference frame images for image decoding. Then, a decoded image is stored in the DRAM after compression. This reduces the amount of display data transferred and displayed and the area of the DRAM which they occupy, compared to the conventional system needing a memory capacity great enough to store a single frame for display. In addition, because the data to be written to the memories 12 and 13 have been compressed in the horizontal direction in a frame image, raster scan data can be rapidly read out with a minimum of memory access time.

Figure 11:
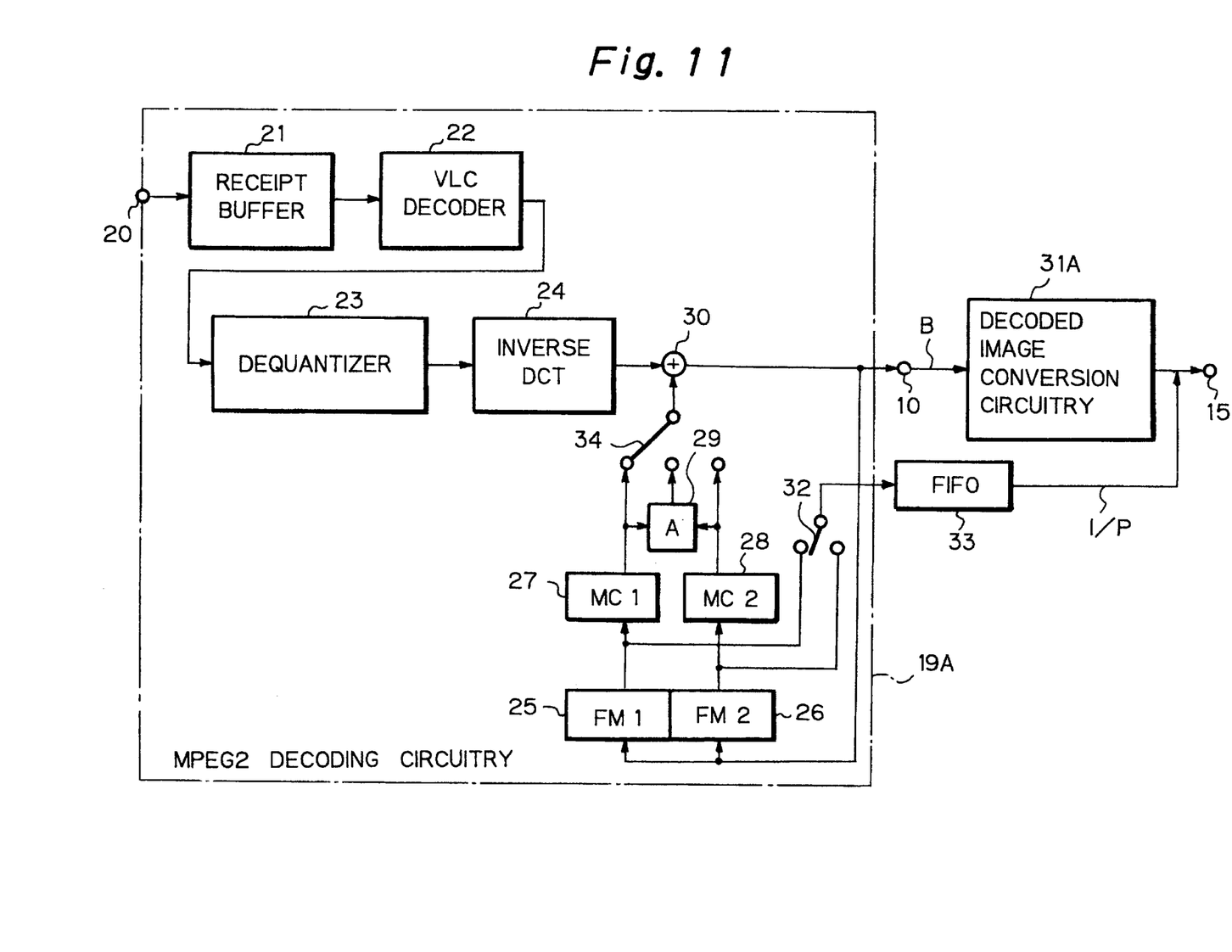
FIG. 11 is a schematic block diagram showing an alternative embodiment of the decoded image converting apparatus in accordance with the present invention.

Referring to FIG. 11, an alternative embodiment of the decoded image converting apparatus in accordance with the present invention will be described. Briefly, this embodiment compresses and then expands only B pictures and adjusts the timing of I and P picture data in order to produce raster scan data in the order of the original picture. In FIG. 11, circuits identical with the circuits shown in FIG. 7 are denoted by identical reference numerals and will not be described in order to avoid redundancy.

As shown in FIG. 11, MPEG2 type image decoding circuitry 19A includes a switch 32 to which I picture and P picture image data are fed from the frame memories 25 and 26, respectively. The switch 32 selects either one of the above picture data at a time and delivers it to a FIFO (First-In First-Out) memory 33. The FIFO memory 33 temporarily stores the image data representative of an I picture or a P picture and then outputs them via- the output port at a timing allowing raster scan data to be formed.

Decoded image converting circuitry 31A receives image data representative of a B picture via the input port 10 and compresses and then expands them so as to output raster scan data. The raster scan data derived from the B picture are output via the output port together with the raster scan data representative of the I and P pictures. In this manner, the FIFO memory 33 and converting circuitry 31A cooperate to output raster scan data via the output port 15 in the order of the original picture.

Figure 12:
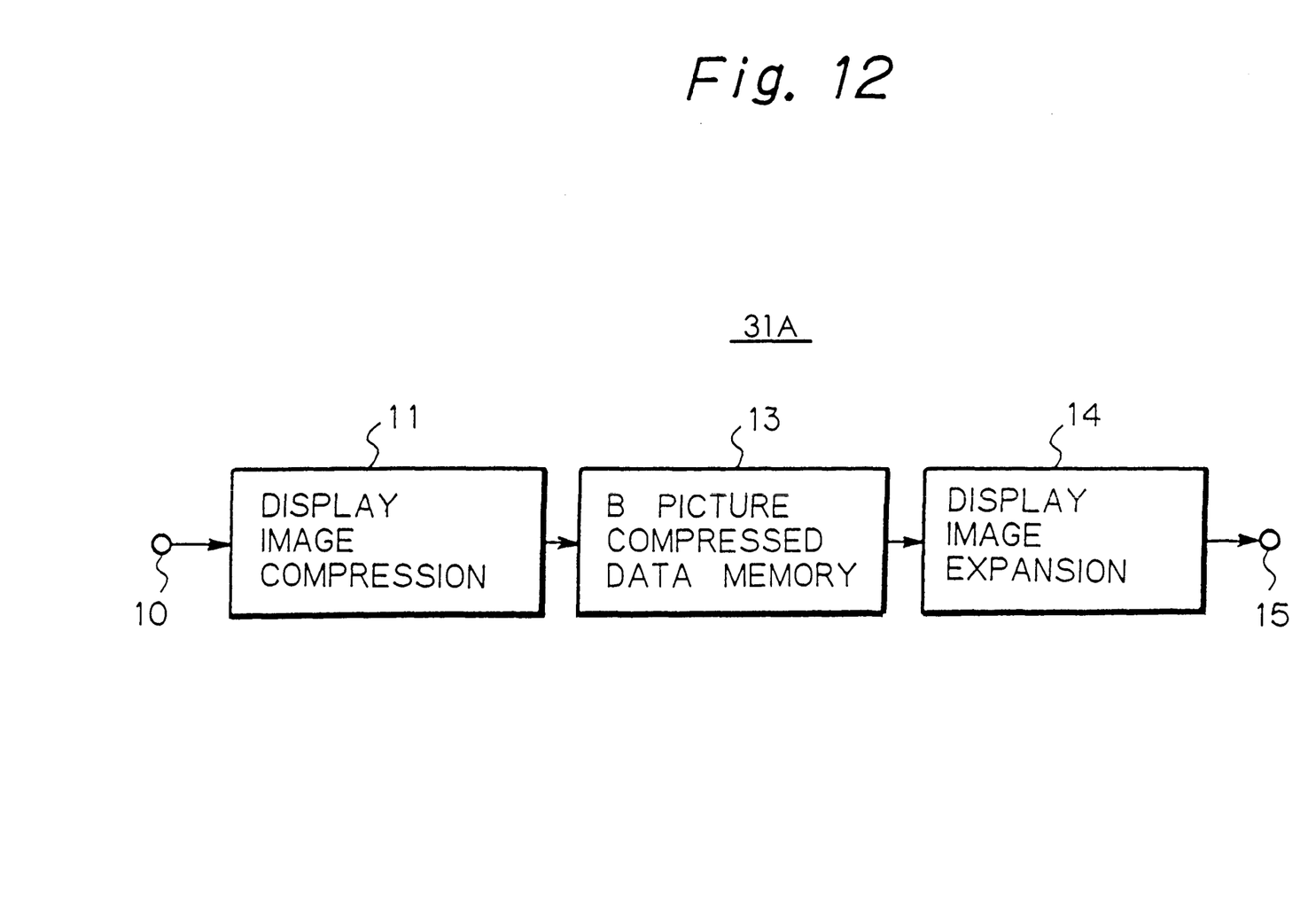
FIG. 12 is a schematic block diagram showing a specific configuration of decoded image converting circuitry included in the alternative embodiment.

FIG. 12 shows a specific configuration of the decoded image converting circuitry 31A. As shown, the display image compression 11 receives P picture image data via the input port 10, compresses the image data by the Huffman coding scheme with the configuration shown in FIG. 9, and feeds the compressed image data to the B picture compressed data memory 13. The memory 13 stores the compressed B picture image data and then reads them out at a suitable timing in relation to I and P picture data. The compressed B picture data are fed from the memory 13 to the display image expansion 14. The expansion 14 expands the input B picture data with the configuration shown in FIG. 10 and delivers the resulting raster scan data via the output port 15.

The converting circuitry 31A is capable of reducing the conventional bit width of a memory bus for memory access and using low-speed access video memories for the same reasons as discussed in relation to the converting circuitry shown in FIG. 1. Further, if the B picture compressed data memory 13 is implemented by a part of the memory space of a large capacity, I and P picture DRAM used to store reference frame images for image decoding, then a decoded image is stored in the memory 13. Again, this reduces the amount of display data transferred and displayed and the area of the DRAM which they occupy, compared to the conventional system needing a memory capacity great enough to store a single frame for display. In addition, because the data to be written to the memory circuit 13 have been compressed in the horizontal direction in a frame image, raster scan data can be rapidly read out with a minimum of memory access time.

Moreover, the configuration and procedure shown in FIGS. 11 and 12 do not have to compress or expand I pictures or P pictures and are therefore simpler than the configuration and procedure of FIG. 7 while reducing the compressing time and expanding time. In addition, the image decoding and decoded image converting procedure shown in FIGS. 11 and 12 may be implemented as a program which can be read by a computer.

While the illustrative embodiments have concentrated on image data coded by the standardized MPEG2 system, they are similarly practicable with image data coded by, e.g., an MPEG1 system, a system prescribed by ITU-T Recommendation H0.261 (compression of digital moving pictures) and sending a frame image in the form of blocks, or a JPEG (Joint Photographic Coding Experts Group) system.

In summary, in accordance with the present invention, only two frame memories suffice, one for I pictures and the other for P pictures. This, coupled with the fact that the two frame memories can be exclusively used for image decoding, allows only two frames of access to be done within a display time corresponding to a single frame from conventional four frames to two frames. Consequently, it is possible to reduce the conventional bit width of a memory bus for memory access and to use low-speed access video memories, realizing efficient processing.

The entire disclosure of Japanese patent application No. 301098/1997 filed on Oct. 31, 1997 and including the specification, claims, accompanying drawings and abstract of the disclosure is incorporated herein by reference in its entirety.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A decoded image converting apparatus comprising:

an inverse transforming circuit for executing, on receiving coded image data coded by rearranging a picture in accordance with a picture type and subjecting a resulting picture to quantization and orthogonal transform, dequantization and inverse orthogonal transform with said coded image data to thereby output image data;

a memory including two memory areas for storing decoded image data respectively representative of an I (Intra coded) picture and a P (Predictive coded) picture;

an adder for outputting, on receiving image data representative of an I picture from said inverse transforming circuit, said image data as decoded image data and writing said image data in one of said two memory areas of said memory, or reading, on receiving image data representative of a P picture from said inverse transforming circuit, image data representative of an I picture or a P picture preceding said P picture out of one of said two memory areas, adding said image data read out to said image data output from said inverse transforming circuit, and outputting resulting decoded image data while writing said decoded image data in the other memory area of said memory, or reading, on receiving image data representative of a B (Bidirectionally predictive coded) picture from said inverse transforming circuit, image data out of said two memory areas, producing mean values, and adding said mean values to said image data output from said inverse transforming circuit to thereby output decoded image data;

a compressing circuit for dividing said decoded image data output from said adder into pixel data sequences each extending in a horizontal direction in a frame image, and compressing each of said pixel data sequences to thereby output compressed image data;

a first storage for storing, among said compressed image data output from said compressing circuit, compressed image data representative of an I picture and compressed image data representative of a P picture;

a second storage for storing, among said compressed image data output from said compressing circuit, compressed image data representative of a B picture; and an expanding circuit for taking in said compressed image data stored in said first storage and said second storage in an order of an original picture and then expanding said compressed image data to thereby output raster scan data.

2. An apparatus in accordance with claim 1, wherein said two memory areas of said memory, a memory area of said first storage and a memory area of said second storage are allotted to a memory space of a single large capacity memory.

3. A decoded image converting method comprising the steps of:

(a) executing dequantization and inverse orthogonal transform with coded image data coded by rearranging a picture in accordance with a picture type and subjecting a resulting picture to quantization and orthogonal transform to thereby output image data;

(b) storing decoded image data respectively representative of an I (Intra coded) picture and a P (Predictive coded) picture in two memory areas of a memory;

(c) outputting image data representative of an I picture output in step (a) as decoded image data while writing said image data in one of said two memory areas of said memory, or reading, when image data representative of a P picture are output in step (a), image data representative of an I picture or a P picture preceding said P picture out of one of said two memory areas, adding said image data read out to said image data representative of said P picture, and outputting resulting decoded image data while writing said decoded image data in the other memory area of said memory, or reading, when image data representative of a B (Bidirectionally predictive coded) picture are output in step (a), image data out of said two memory areas, producing mean values, and adding said mean values to said image data representative of said B picture to thereby output decoded image data;

(d) dividing said decoded image data output in step (c) into pixel data sequences each extending in a horizontal direction in a frame image, and compressing each of pixel data sequences to thereby output compressed image data;

(e) storing, among said compressed image data output in step (d), compressed image data representative of an I picture and compressed image data representative of a P picture in a first storage assigned to the I picture and the P picture;

(f) storing, among said compressed image data output in step (d), compressed image data representative of a B picture in a second storage assigned to the B picture; and (g) taking in said compressed image data from said first storage and said second storage in an order of an original picture and then expanding said compressed image data to thereby output corresponding raster scan data.

4. In a data recording medium capable of being read by a computer and storing a decoded image conversion program, said decoded image conversion program comprises the steps of:

(a) executing dequantization and inverse orthogonal transform with coded image data coded by rearranging a picture in accordance with a picture type and subjecting a resulting picture to quantization and orthogonal transform to thereby output image data;

(b) storing decoded image data respectively representative of an I (Intra coded) picture and a P (Predictive coded) picture in two memory areas of a memory;

(c) outputting image data representative of an I picture output in step (a) as decoded image data while writing said image data in one of said two memory areas of said memory, or reading, when image data representative of a P picture are output in step (a), image data representative of an I picture or a P picture preceding said P picture out of one of said two memory areas, adding said image data read out to said image data representative of said P picture, and outputting resulting decoded image data while writing said decoded image data in the other memory area of said memory, or reading, when image data representative of a B (Bidirectionally predictive coded) picture are output in step (a), image data out of said two memory areas, producing mean values, and adding said mean values to said image data representative of said B picture to thereby output decoded image data;

(d) dividing said decoded image data output in step (c) into pixel data sequences each extending in a horizontal direction in a frame image, and compressing each of pixel data sequences to thereby output compressed image data;

(e) storing, among said compressed image data output in step (d), compressed image data representative of an I picture and compressed image data representative of a P picture in a first storage assigned to the I picture and the P picture;

(f) storing, among said compressed image data output in step (d), compressed image data representative of a B picture in a second storage assigned to the B picture; and (g) taking in said compressed image data from said first storage and said second storage in an order of an original picture and then expanding said compressed image data to thereby output corresponding raster scan data.

* * * * *